United States Patent [19]
Mikami et al.

[11] Patent Number: 5,389,868
[45] Date of Patent: Feb. 14, 1995

[54] DRIVE CONTROL APPARATUS FOR DRIVEN MACHINE AND PARAMETER DISPLAY METHOD IN DRIVE CONTROL APPARATUS FOR DRIVEN MACHINE

[75] Inventors: Nobuhiro Mikami; Hisaaki Tsukahara; Hiroshi Yamada; Satomi Yamauchi, all of Aichi, Japan

[73] Assignee: Mitsubishi Denki Kabushiki Kaisha, Tokyo, Japan

[21] Appl. No.: 16,925

[22] Filed: Feb. 12, 1993

[30] Foreign Application Priority Data

Apr. 10, 1992 [JP] Japan .................................. 4-090939
Sep. 28, 1992 [JP] Japan .................................. 4-258062

[51] Int. Cl.$^6$ ......................... H02M 5/00; H02P 5/00
[52] U.S. Cl. ................................. 318/632; 318/268; 318/85; 318/596; 112/451; 112/454; 112/456
[58] Field of Search ............... 318/372, 376, 369, 567, 318/727, 254, 687; 112/121.11, 275, 103, 277, 273, 220, 259, 119, 456, 457, 453, 458, 121.12, 445; 364/171, 475, 193, 474, 22

[56] References Cited

U.S. PATENT DOCUMENTS

| | | | |
|---|---|---|---|
| 4,594,670 | 6/1986 | Itoh | 318/632 X |
| 4,915,041 | 4/1990 | Takenoya | 112/121.12 |
| 5,008,601 | 4/1991 | Nakamura et al. | 318/268 |
| 5,016,550 | 5/1991 | Horie et al. | 112/454 |
| 5,025,740 | 6/1991 | Horie et al. | 112/456 |
| 5,027,734 | 7/1991 | Horie et al. | 112/451 |
| 5,074,232 | 12/1991 | Matsubara et al. | 112/445 |
| 5,099,777 | 3/1992 | Mori | 112/121.11 |
| 5,127,063 | 6/1992 | Nishiya et al. | 318/596 X |
| 5,144,902 | 9/1992 | Hirabayashi | 112/292 |
| 5,153,840 | 10/1992 | Shigeta et al. | 112/121.11 |
| 5,202,611 | 4/1993 | Uehara et al. | 318/85 |

FOREIGN PATENT DOCUMENTS 415088  1/1992 Japan .

*Primary Examiner*—Paul Ip
*Attorney, Agent, or Firm*—Sughrue, Mion, Zinn, Macpeak & Seas

[57] ABSTRACT

A drive control apparatus for a driven machine is designed to easily check which of a plurality of parameters indicating the control characteristics of the driven machine have been changed from their factory-set initial values. Initial parameter values are stored in a list in a first memory and current parameter values are stored in a second memory. When a display request is given, the initial values of parameters stored in the first list in a control section are compared to the current values of the parameters stored in nonvolatile memory. The identity of the parameters that have been changed from their initial values are displayed on a liquid crystal display. Also, the stored initial value list is displayed.

4 Claims, 13 Drawing Sheets

FIG. 11
FIG. 11 (a)
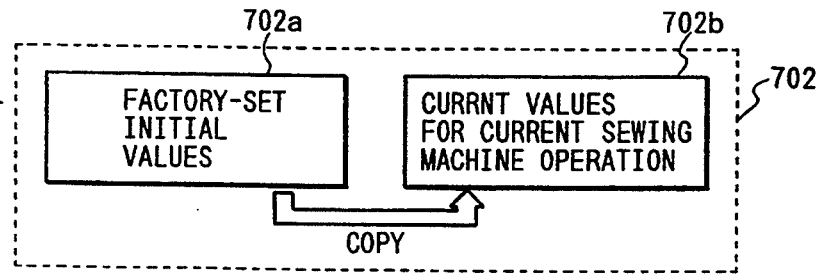
FIG. 11 (b)
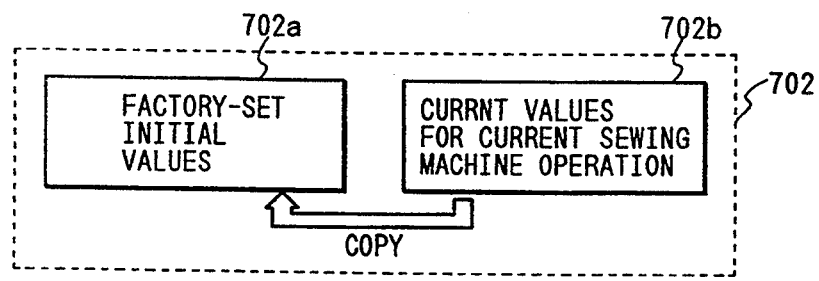
FIG. 11 (c)
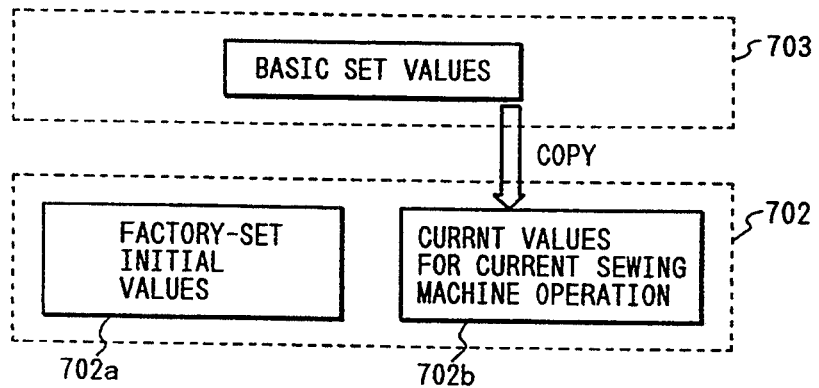
FIG. 11 (d)
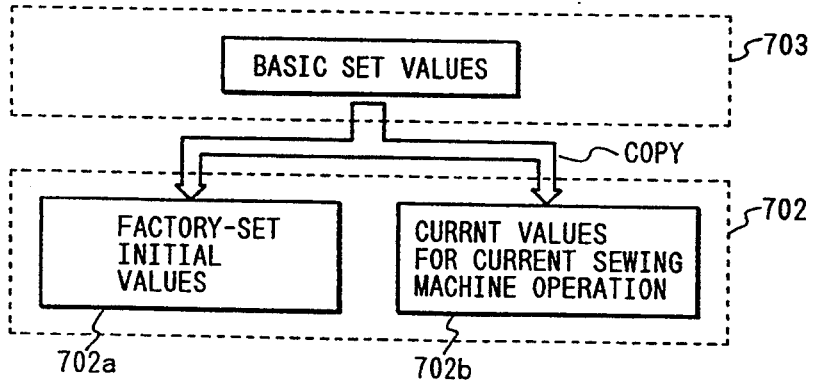

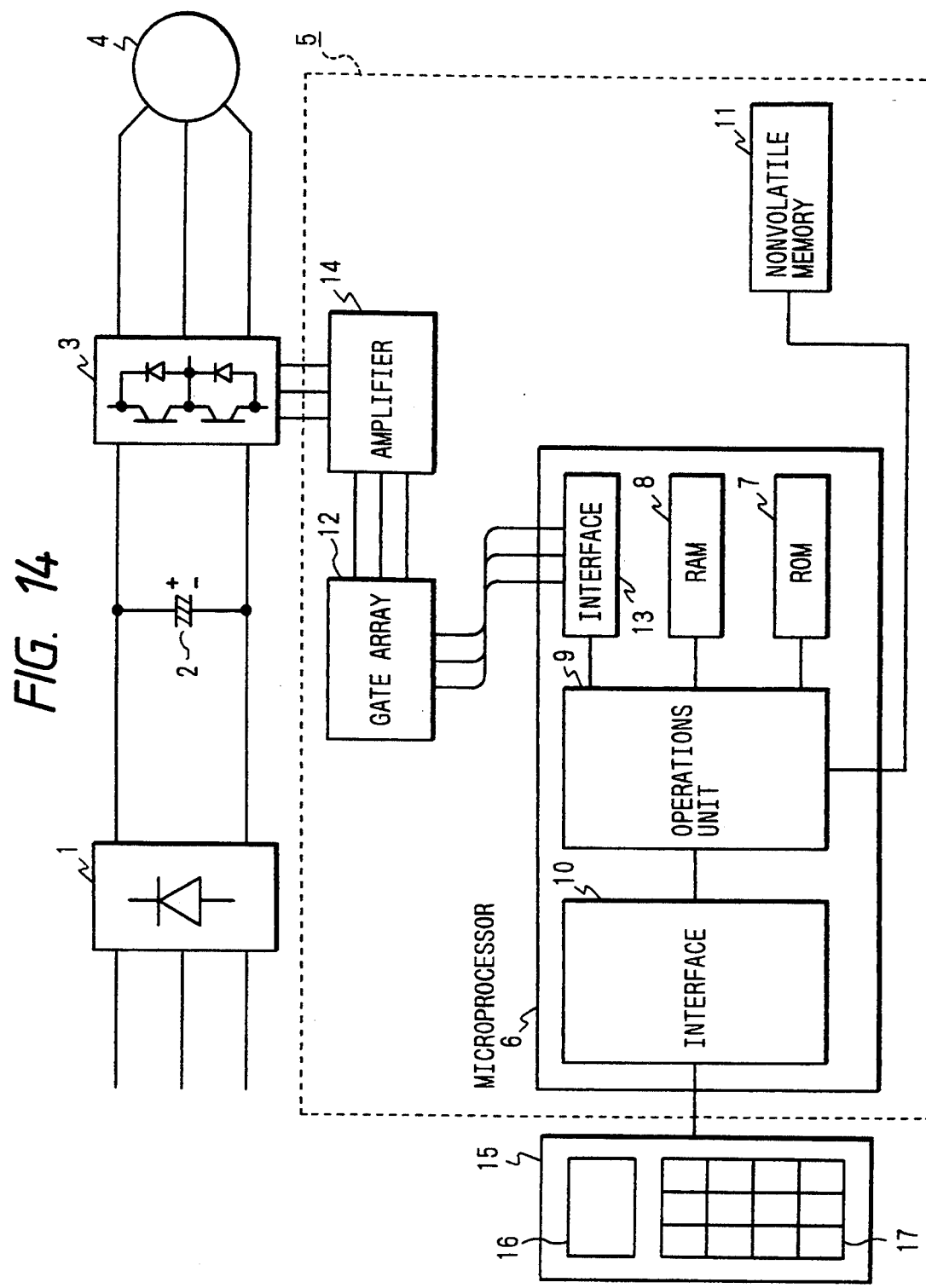

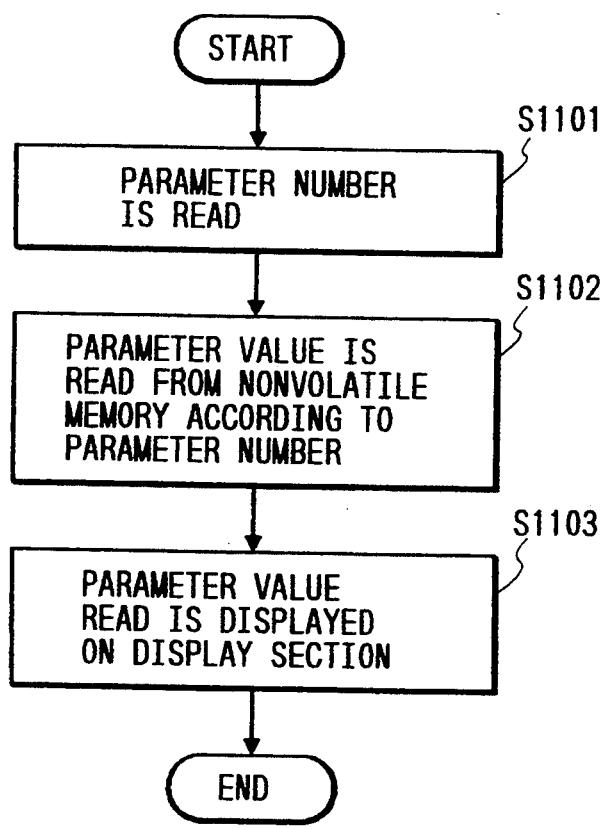

DRIVE CONTROL APPARATUS FOR DRIVEN MACHINE AND PARAMETER DISPLAY METHOD IN DRIVE CONTROL APPARATUS FOR DRIVEN MACHINE

BACKGROUND OF THE INVENTION

1. Field of the Invention

The present invention relates to a drive control apparatus for a driven machine, such as a motor, controlled according to parameters and to a parameter displaying method in the drive control apparatus for the driven machine.

2. Description of the Background Art

In describing the conventional designs that are relevant as background to the present invention, an inverter apparatus will be employed as an example of a motor drive apparatus for a sewing machine, solely for convenience of description. Of course, the invention will not be limited thereto.

FIG. 14 is a block diagram illustrating a drive control apparatus for a driven machine, e.g., an inverter apparatus, known in the art, wherein the numeral 1 indicates a converter module for rectifying three-phase alternating current, 2 denotes a capacitor for smoothing the rectified output of the converter module 1, 3 represents an inverter module for converting direct current, or the smoothed output of the capacitor 2, into alternating current, and 4 designates a driven machine, e.g., an induction motor, connected to the inverter module 3.

5 indicates a control section for controlling the inverter module 3, 6 denotes a microprocessor, 7 designates a ROM, 8 represents a RAM, 9 indicates an operations unit, and 11 represents non-volatile memory consisting of memory devices which do not lose data if the power of the inverter apparatus is shut off. This non-volatile memory 11 is referred to as a current value storage.

Constants employed to control the induction motor 4, e.g., acceleration time, deceleration time, base frequency and maximum frequency limit, are stored in the non-volatile memory 11 as parameter values. Each of these constants is identified by a corresponding parameter number from a sequence and is stored in the non-volatile memory 11 along with the parameter value.

Generally, there are 20 to 50 types of parameters or constants applicable to the operation of a machine and initial values are set for each of the parameter numbers, before the apparatus is shipped from a factory, by storing appropriate parameter values in the non-volatile memory 11.

12 indicates a gate array, and 13 represents an interface provided between the operations unit 9 and the gate array 12. The operations unit 9 will generate a signal for controlling the motor via inverter module 3. On receipt of a PWM signal transmitted from the operations unit 9 via the interface 13, the gate array 12 provides upper arm/lower arm short-circuit prevention times for the input PWM signal.

14 indicates an amplifier for amplifying the PWM signal which is provided with the upper/lower arm short-circuit prevention time by the gate array 12 so that the signal can drive transistors (upper and lower arm transistors) bridge-connected in the inverter module 3. The ROM 7, the RAM 8, the operations unit 9, an interface 10 and the interface 13 constitute the microprocessor 6. The microprocessor 6, the non-volatile memory 11, the gate array 12 and the amplifier 14 constitute the control section 5.

15 indicates parameter setting apparatus, represents a data display section, and 17 designates a data input section. The parameter setting apparatus 15 consists of the data display section 16 and the data input section 17. The data display section 16 has four seven-segment LED's 16a arranged as shown in FIG. 15 to display a four-digit numeral. The parameter setting apparatus 15 can transfer signals to and from the control section 5 via the interface 10 in the microprocessor 6.

The operation of the conventional apparatus shown in FIG. 14 will now be described. The alternating current input to the converter module 1 is rectified and then input to the capacitor 2 and smoothed there when the smoothed direct current is input to the inverter module 3, it is converted into the alternating current under the control of the PWM signal output from the control section 5, and the alternating current is supplied to the induction motor 4.

The control section 5 reads a program from the ROM 7 and also reads parameter values from the non-volatile memory 11, and the operations unit 9 performs operations using the RAM 8 and generates the PWM signal. The PWM signal generated is input to the gate array 12 through the interface 13. The gate array 12 provides the upper/lower arm short-circuit prevention time for the PWM signal input from the interface 13, and inputs the signal to the amplifier 14. Also, the amplifier 14 amplifies the PWM signal provided with the upper/lower arm short-circuit prevention time, and supplies it to the inverter module 3.

The control section 5 stores the parameter values, which have been input from the data input section 17 of the parameter setting apparatus 15, into the non-volatile memory 11 and drives the induction motor 4 in accordance with the parameter values stored.

The parameter values stored in the non-volatile memory 11 must be rewritten to optimum values according to the drive control characteristics of the induction motor 4, the induction motor 4 to be driven, the load of the induction motor 4, etc. This rewrite is performed from the parameter setting apparatus 15 as described above.

Namely, new parameter data input from the data input section 17 of the parameter setting apparatus 15 is transferred to the operations unit 9 via the interface 10. Subsequently, the new data is written to the non-volatile memory 11 via the operations unit 9, whereby the contents of the non-volatile memory 11 are rewritten.

To examine which of the parameters existing in the non-volatile memory 11 have been updated from the initial factory-set values, it is required to repeat the operation shown as a flowchart in FIG. 16 to check all parameters, using the parameter setting apparatus 15.

A method of examining which parameters have been updated will now be described with reference to the flowchart shown in FIG. 16. Referring to FIG. 16, a parameter number is specified from the parameter setting apparatus 15 at step S1101 to identify the parameter to be read, and the execution progresses to next step S1102. At step S1102, the parameter value of the parameter specified at step S1101 is read from the nonvolatile memory 11, and the processing advances to next step S1103.

At step S1103, the data read at step S1102 is transferred from the operations unit 9 to the parameter setting apparatus 15 via the interface 10 and is displayed on the data display section 16. An operator then verifies the data displayed on the data display section 16 with a factory-set initial value list given in an instruction manual or the like to check whether or not the corresponding parameter has been rewritten.

Which parameter has been rewritten cannot be identified until the steps S1101 to S1103 have been repeated for all parameters.

Since the conventional drive control apparatus for a driven machine, for which the inverter apparatus for drive-controlling the motor may be taken as a typical example, is designed as described above, a factory-set initial value list must be prepared separately, and the operation of reading the parameter and the judgment of whether the parameter read matches said initial value list must be performed manually for all parameters in order to check for any parameter rewritten after the shipment from the factory. This approach clearly is inefficient and subject to human error.

Also, the data display section 16 only displays a four-digit numeral and cannot display the parameter number and parameter value at the same time. Hence, the operator cannot determine which of the parameter values is currently being displayed.

Also, if a wrong setting has been made, it is required to return the parameter value to the initial value, check the initial value, and make a re-setting. However, a return to the initial value was difficult. In addition, when the same settings were to be made to a plurality of driven machines, it was required to make parameter settings for the number of driven machines, taking much time for setting.

SUMMARY OF THE INVENTION

It is, accordingly, an object of the present invention to overcome the disadvantages in the conventional art by providing a drive control apparatus for a driven machine and a parameter displaying method in the drive control apparatus for the driven machine which can easily display all of the parameters that have been changed.

It is another object of the present invention to provide a drive control apparatus for a driven machine which stores initial values prior to parameter setting changes, and allows the initial values and current values, or current set values, to be copied optionally by a programmed operation and further allows the set values to be copied optionally from an external device.

The invention achieves a driven machine drive control apparatus and its parameter displaying method which ensure ease of identifying which parameter has a mismatch between its initial value and current value and how it has been changed from the initial value. This will prevent a driven machine from operating abnormally due to wrong parameter value setting. The contents of the initial value storage storing the initial values of a plurality of parameters of the driven machine drive control means for drive-controlling the driven machine according to the parameters indicating the control characteristics of the driven machine are compared against the contents of the current value storage storing the current values of the parameters, and any parameter having a mismatch between the initial value and current value is displayed. The display may also include the parameter initial value or current value according to the results of the comparison.

It will also be apparent that the present invention allows a parameter value to be immediately returned to an initial value if wrong parameter setting has been made and a previous set value is unknown.

It will also be apparent that the present invention allows current set values to be initial values when parameter settings are complete, whereby said set values can be restored immediately if their settings are changed later.

It will also be apparent that the present invention allows parameter values to be immediately changed to basic set values, with which the driven machine drive control apparatus operates on a given assumption, if initial values have also been corrupted.

It will also be apparent that the present invention allows the same data to be input from an external device to a plurality of driven machine drive control apparatuses, reducing setting work time.

BRIEF DESCRIPTION OF THE DRAWINGS

FIG. 11 illustrates the items of data stored in rewritable storing means in a case where .the present invention applies to the sewing machine control apparatus.

FIG. 14 is a block diagram illustrating a conventional drive control apparatus.

FIG. 16 shows a display example of a data display section in the conventional drive control apparatus.

DESCRIPTION OF THE PREFERRED EMBODIMENTS

A first embodiment of the present invention will now be described with reference to a block arrangement diagram shown in FIG. 1 concerning an example wherein the present invention applies to a motor drive control apparatus such as an inverter apparatus.

Figure 1:
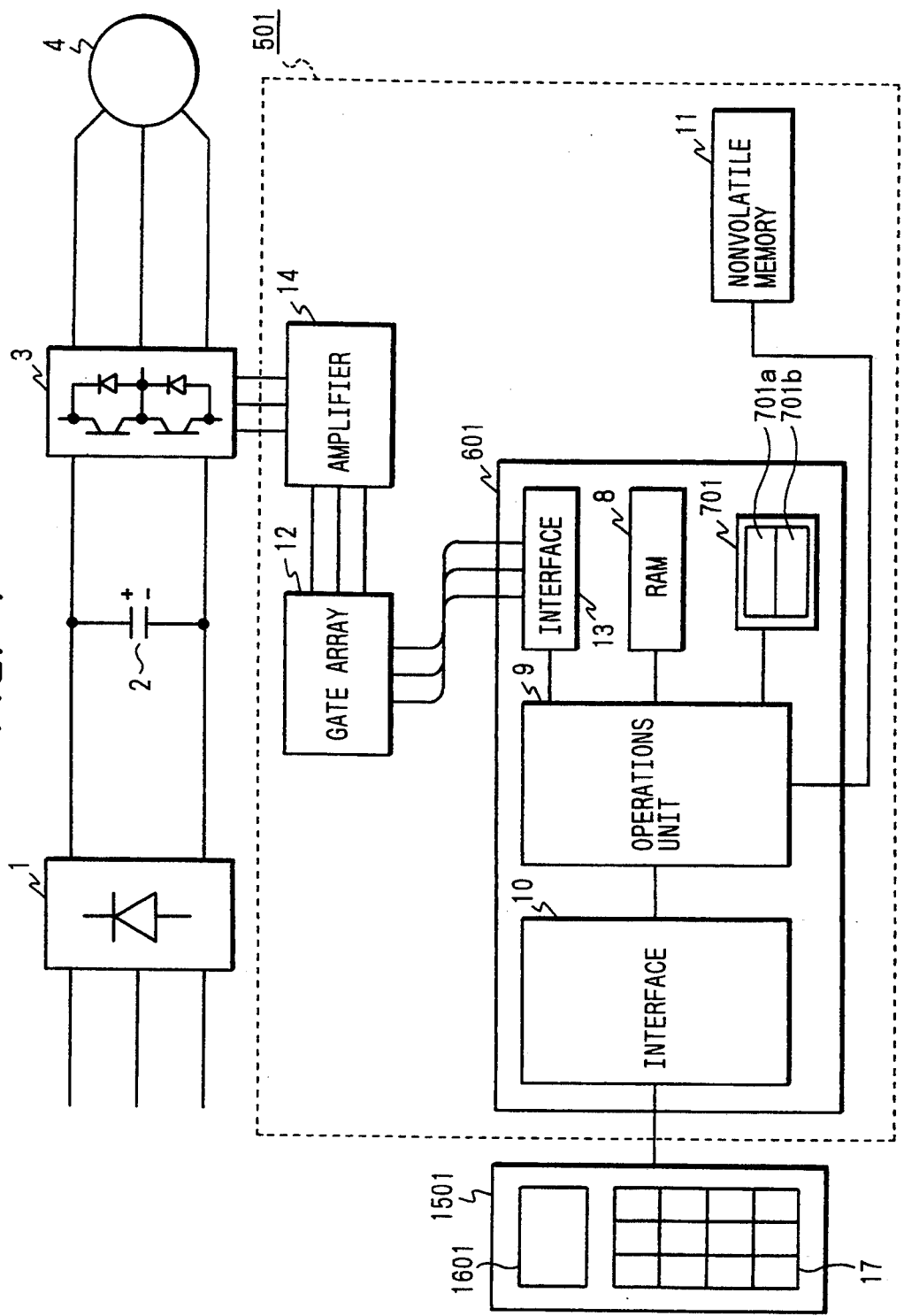
FIG. 1 is a block diagram illustrating a preferred embodiment of the present invention.

Referring to FIG. 1, the numeral 501 indicates a control section, 601 denotes a microprocessor provided in the control section 501, and 701 represents ROM provided in the microprocessor 601. 701a indicates an area of the ROM 701 wherein a program for controlling the induction motor 15 4 is stored, and 701b designates an area of the ROM 701 wherein the initial values of parameters are stored in order of parameter numbers. The area 701b of the ROM 701 is referred to as an "initial value storage".

1501 indicates parameter setting apparatus and 1601 designates a display section which can display four lines of twelve numerals or characters per line, e.g., a liquid crystal display. This liquid crystal display 1601 is provided in the parameter setting apparatus 1501.

1 to 4, 8 to 14 and 17 represent parts identical to those in FIG. 14 illustrating the conventional apparatus and therefore will not be described here. The driven machine drive control apparatus comprises the converter module 1, the capacitor 2, the inverter module 3, the ROM 701, the RAM 8, the operations unit 9, the non-volatile memory 11, the gate array 12, the interface 13 and the amplifier 14.

The operation of the embodiment of the present invention shown in FIG. 1 will now be described in accordance with the flowcharts illustrated in FIGS. 2 and 3. When parameter read operation is performed from the input section 17 of the parameter setting apparatus 1501, it is first determined at step S201 whether or not the parameters are simply to be read. If they are only being read, the execution proceeds to step S231, shown in FIG. 3. If the desired operation is not a simple parameter read operation, the processing goes to step S202.

At step S202, the address pointers of the non-volatile memory 11 and the area 701b of the ROM 701 are zeroed. It should be noted that zeroing the address pointer of the ROM 701 area 701b specifies the first address of the area 701b.

At step S203, it is judged whether a parameter initial-value list is requested or not. If it is being requested, the processing advances to step S221. If it is not requested, the execution progresses to step S204. At step S204, it is determined whether a parameter current-value list is requested or not. If it is not requested, the execution goes to end step S240. If that list is being requested, the operation moves to next step S205.

At step S205, the parameter value, i.e., current value, stored in the non-volatile memory 11 in order of parameter numbers is read and the processing proceeds to step S206. At step S206, the program stored in the RAM 8 and the operations unit 9 cause the initial value stored in the area 701b to be read in order of parameter numbers, and cause the initial value read to be compared to the parameter value read at step S205. The comparison is performed by the RAM 8, the program stored in the RAM 8, and the operations unit 9.

At step S207, the existence of a match is determined. The processing progresses to step S209 if a match occurs as a result of the comparison at step S206, or the processing advances to step S208 if a mismatch is found.

At step S208, the current parameter value and the corresponding parameter number, which identifies the parameter whose initial value has been changed, are displayed on the liquid crystal display 1601, and the processing goes on to step S210.

At step S209, "-" indicating that no parameter change has occurred and the parameter number are displayed on the liquid crystal display 1601, and the processing goes on to step S210.

At step S210, the address pointer of the non-volatile memory 11 is incremented by 1 and the processing advances to step S211. At step S211, it is determined whether or not all or a predetermined number of parameters have been displayed. If they have not yet been displayed, the processing returns to step S205. If they have already been displayed, the processing progresses to end step S240 and is terminated.

Figure 4:
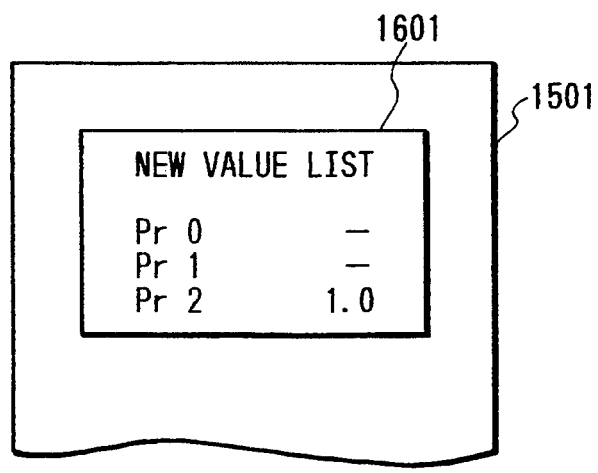
FIG. 4 shows a display example of a liquid crystal display according to the preferred embodiment of the present invention illustrated in FIG. 1.

FIG. 4 shows a display example of the liquid crystal display 1601, wherein "NEW VALUE LIST" shown on the first line indicates that the data displayed is related to parameter changes. The subsequent items "Pr 0 -" and "Pr 1 -" shown on the second and third lines indicate, respectively, that the parameter number of the parameter displayed on the second line is 0 and the corresponding parameter value remains unchanged from its factory-set value and that the parameter number of the parameter displayed on the third line is 1 and the corresponding parameter value remains unchanged from its initial or factory-set value.

Also, "Pr 2 1.0" displayed on the fourth line indicates that the parameter value of parameter number 2 is currently 1.0 and the corresponding parameter value has been changed from its initial value. Namely, which parameter has been changed from its factory-set value and how that parameter has been changed is displayed on the liquid crystal display 1601.

If the data input section 17 of the parameter setting apparatus 1501 simply requests a display of the current value of any specified parameter, identified by parameter number, the processing proceeds from step S201 to step S231 as described previously. The parameter number is read at step S231 and the processing advances next to step S232. At step S232, the parameter value is read from the predetermined address of the non-volatile memory 11 according to the parameter number read, and the processing moves on to step 233.

Figure 5:
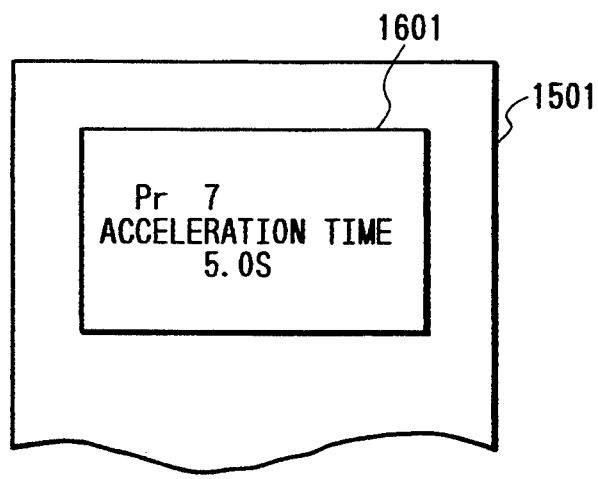
FIG. 5 shows a display example of the liquid crystal display according to the preferred embodiment of the present invention illustrated in FIG. 1.

At step S233, the parameter number, parameter name and parameter value are displayed on the liquid crystal display 1601, and the processing progresses to the final step S240. FIG. 5 shows a display example of the liquid crystal display 1601, wherein "Pr 7" displayed on the first line indicates that the parameter number of the parameter displayed is 7, "ACCELERATION TIME" displayed on the second line means that its parameter name is acceleration time, and "5.0S" displayed on the third line shows that the acceleration time is 5.0 seconds.

If the operation requested from the data input section 17 of the parameter setting apparatus 1501 is to output the initial value list of the parameters, the processing progresses from step S203 to step S221 as described previously.

At step S221, the initial value stored in the area 701b of the ROM 701 is read in order of parameter numbers and the processing advances to step S222. At step S222, the initial value read at step S221 and the corresponding parameter number are displayed on the liquid crystal display 1601 of the parameter setting apparatus 1501 and the processing moves on to step S223.

At step S223, the address pointer of the area 701b is incremented by 1 and the processing proceeds to the next step S224. At step S224, it is judged whether or not all or the predetermined number of initial values have been displayed. If they have not yet been displayed, the processing returns to step S221. If they have already been displayed, the processing progresses to the final step S240 and is terminated.

Figure 6:
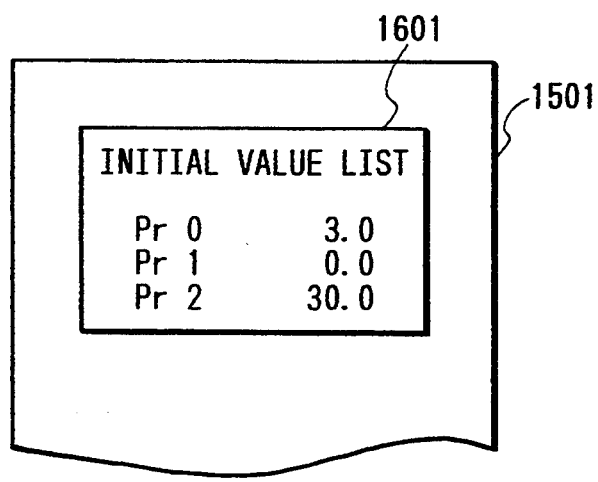
FIG. 6 shows a display example of the liquid crystal display according to the preferred embodiment of the present invention illustrated in FIG. 1.

FIG. 6 shows an initial value display example of the liquid crystal display 1601, wherein "INITIAL VALUE LIST" displayed on the first line indicates that the data displayed is related to initial values, i.e., factory-set parameter values, and "Pr 0 3.0" displayed on the second line means that the parameter number of the parameter displayed on this line is 0 and its parameter value is 3.0. "Pr 1 0.0" and "Pr 2 30.0" displayed on the third and fourth lines indicate, respectively, that the parameter value of parameter number 1 is 0.0 and that the parameter value of parameter number 2 is 30.0.

Figure 7:
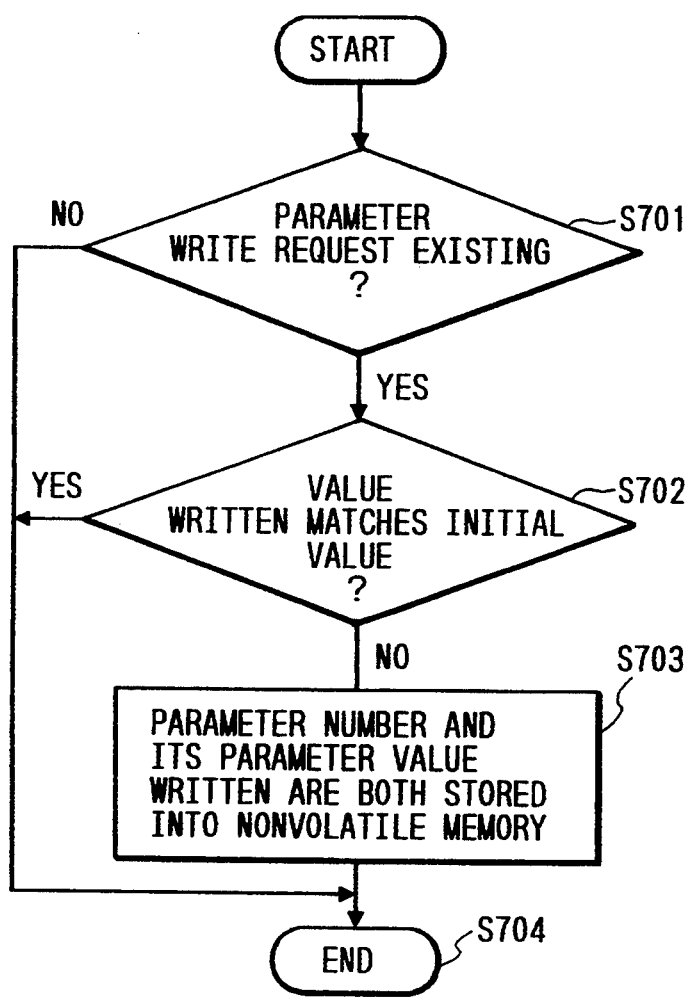
FIG. 7 is a flowchart illustrating a sequence of operations according to another preferred embodiment of the present invention.

When a request to output a parameter list having new values changed from the factory-set values was made in the first embodiment, the contents of the non-volatile memory 11 and the initial values of the parameters stored in the area 701b of the ROM 701 were read in order of parameter numbers, whether the data read matched or not was determined, and if a match did not occur, the corresponding parameter number and parameter value were displayed on the liquid crystal display 1601. By contrast, as shown in a flowchart in FIG. 7 representing the second embodiment of the invention, when an input parameter value is changed from its initial value, an "updated parameter storage" will cause the input parameter value to be stored. The updated parameter storage, therefore, stores a list of only those parameters whose parameter values have been changed from their initial values.

In this case, the non-volatile memory 11 is employed as the updated parameter storage, and the updated parameter storing process is conducted by the operations unit 9, the RAM 8 and the program stored in RAM 8.

The flowchart shown in FIG. 7 will now be described. At step S701 in FIG. 7, it is determined whether or not there is a parameter write request. If it exists, the processing advances to step S702. If it does not exist, the processing proceeds to final step S704 and is terminated. At step S702, whether or not a written parameter value and the corresponding initial value match is determined by the updated parameter storing unit. If a match is not found, the processing progresses to step S703. If a match is found, the processing goes on to final step S704 and is terminated.

At step S703, the updated parameter storing unit stores both the mismatching parameter value and the corresponding parameter number into the nonvolatile memory 11, and the processing advances to the final step S704 and is terminated.

Figure 8:
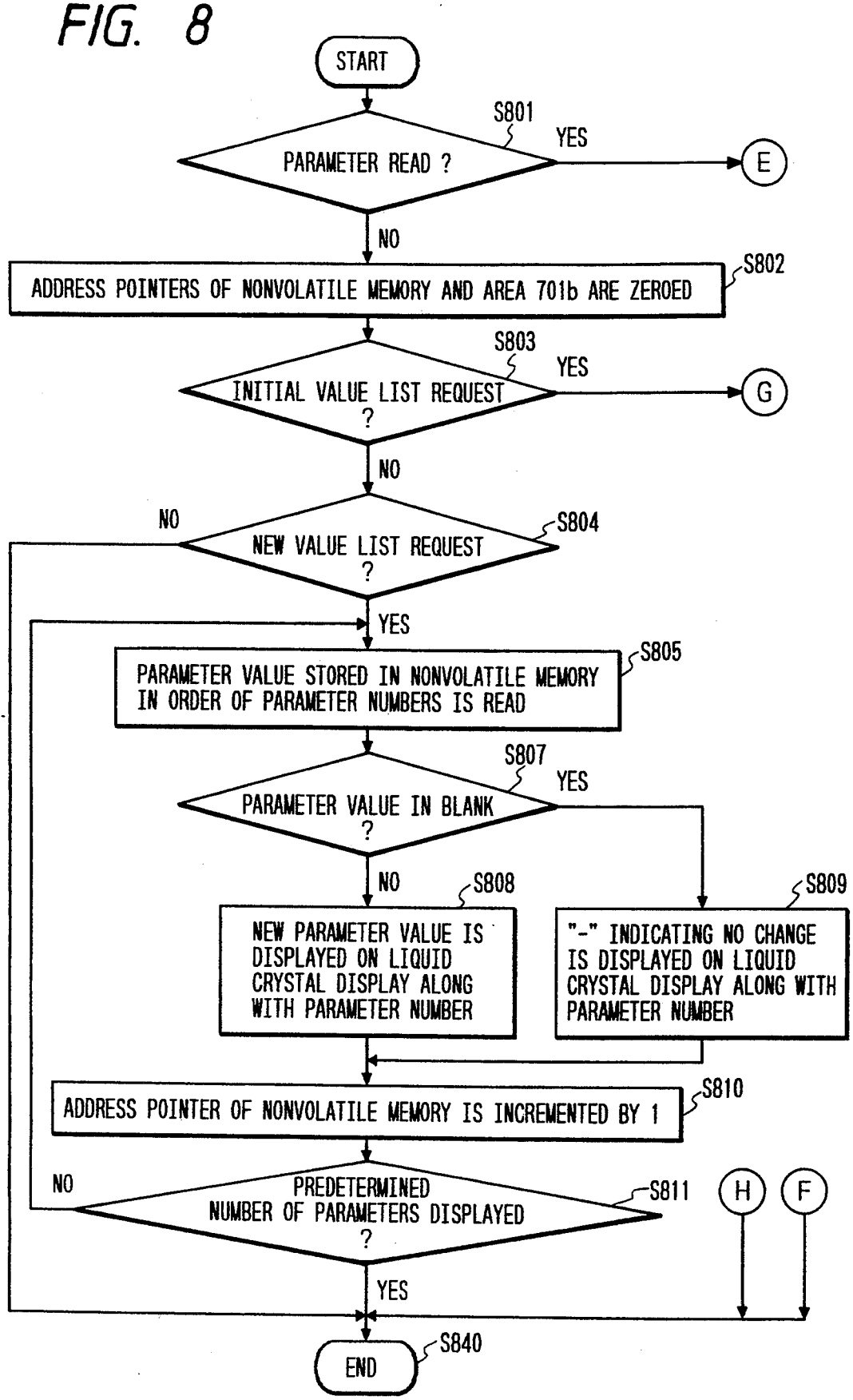
FIG. 8 is a flowchart illustrating a sequence of operations according to another preferred embodiment of the present invention.
Figure 9:
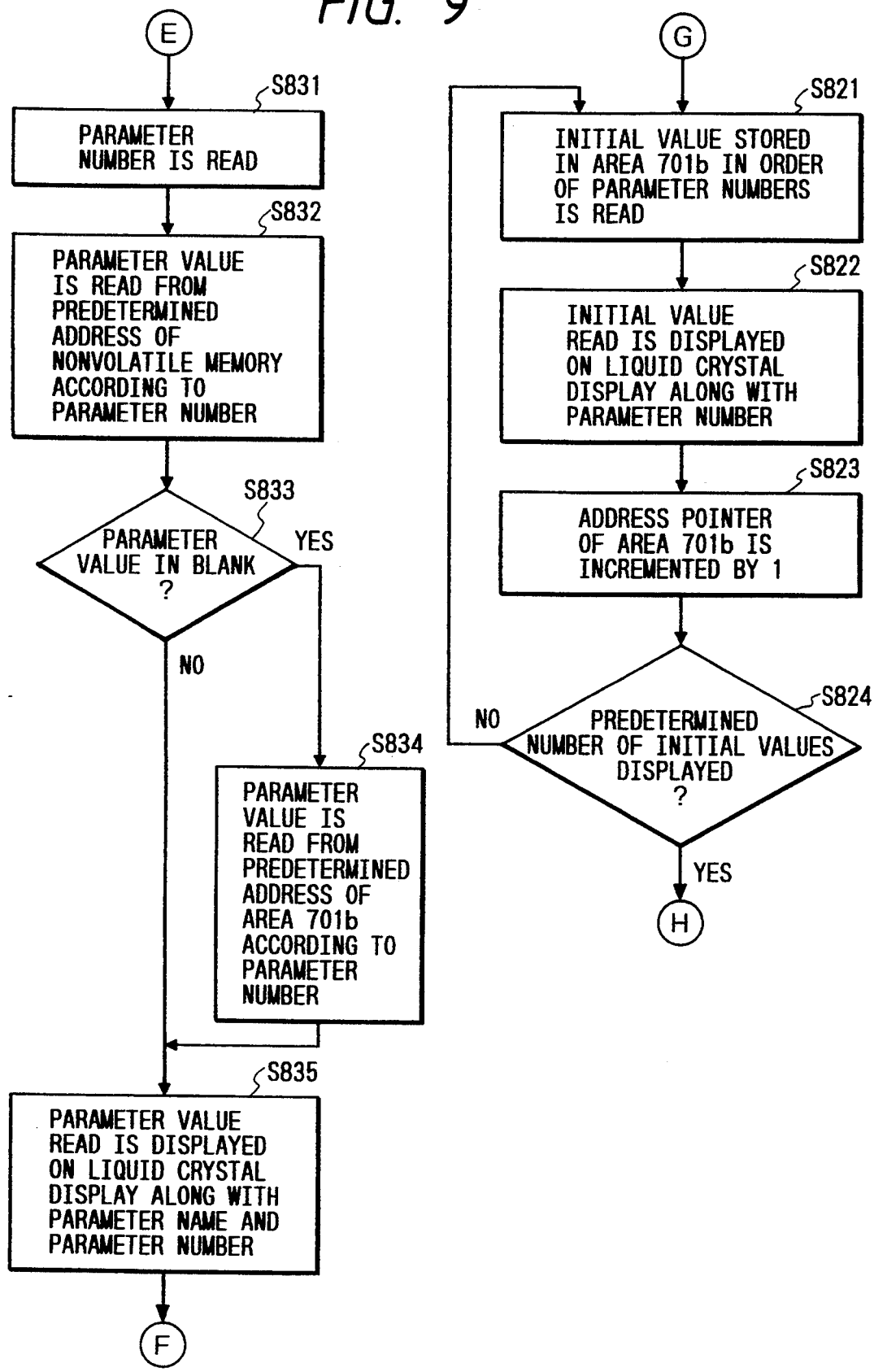
FIG. 9 is a flowchart illustrating a sequence of operations according to another preferred embodiment of the present invention.

FIGS. 8 and 9 are flowcharts indicating the display operation for the above processing. First, the operation performed by a request for a new value list will be described with reference to FIG. 8. When a request for a new value list is made, the processing progresses in sequence of steps S801, S802, S803, S804 and S805, at which step the parameter value stored in the non-volatile memory 11 in order of parameter numbers is read, and the processing advances to step S807. Operations at steps S801 to S804 will not be described here since they are identical to those at steps S201 to S204 given in FIG. 2. A step numbered S806 is intentionally omitted.

At step S807, it is determined whether or not there is a parameter prewritten depending on whether the parameter value read at step S805 is insignificant, e.g., a blank or not applicable code (N/A), or significant. When it has been determined that the parameter was prewritten, the processing proceeds to step S808. When it has been determined that the parameter was not prewritten, the processing advances to step S809.

Figure 2:
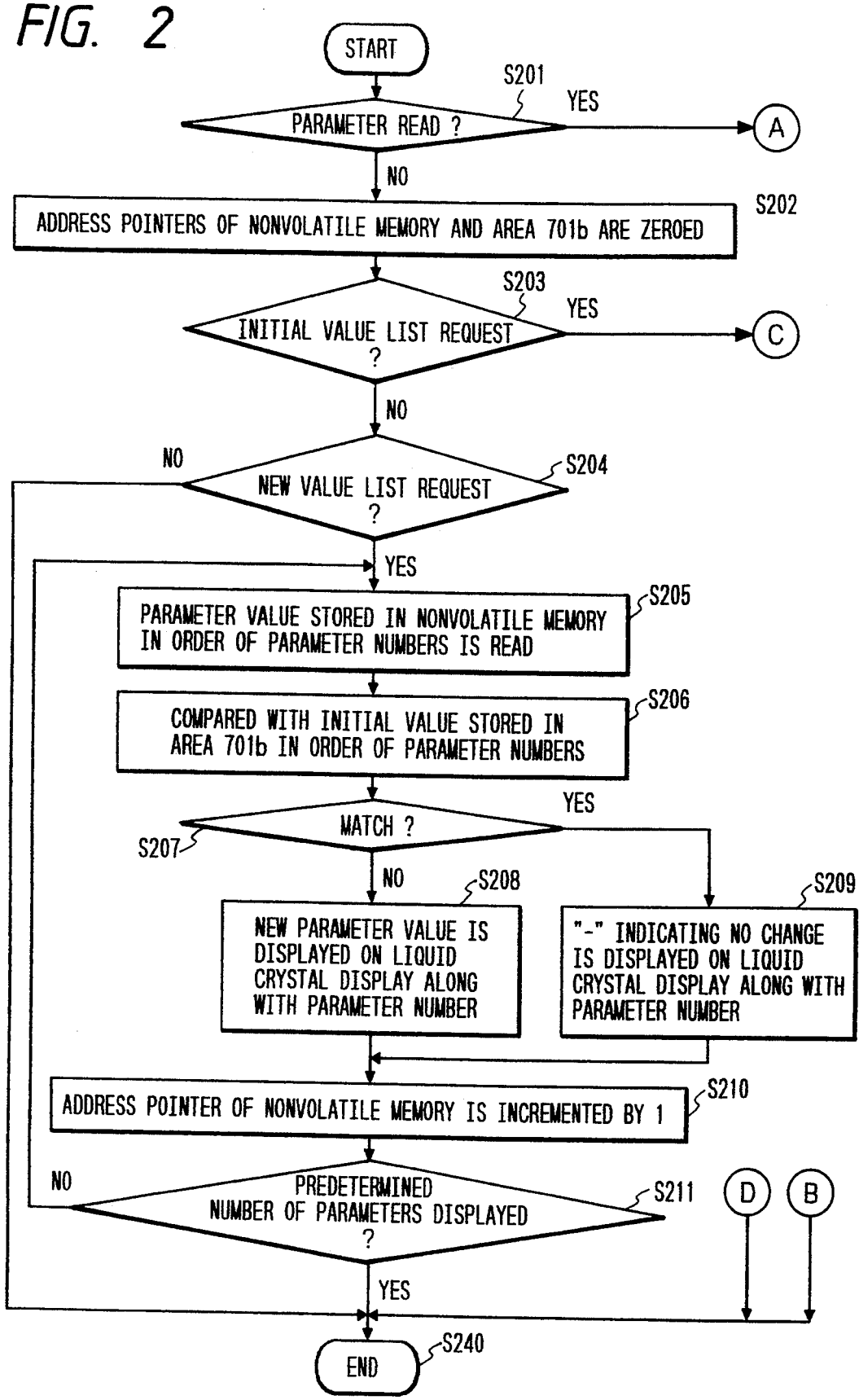
FIG. 2 is a flowchart illustrating a sequence of operations according to the preferred embodiment of the present invention shown in FIG. 1.
Figure 3:
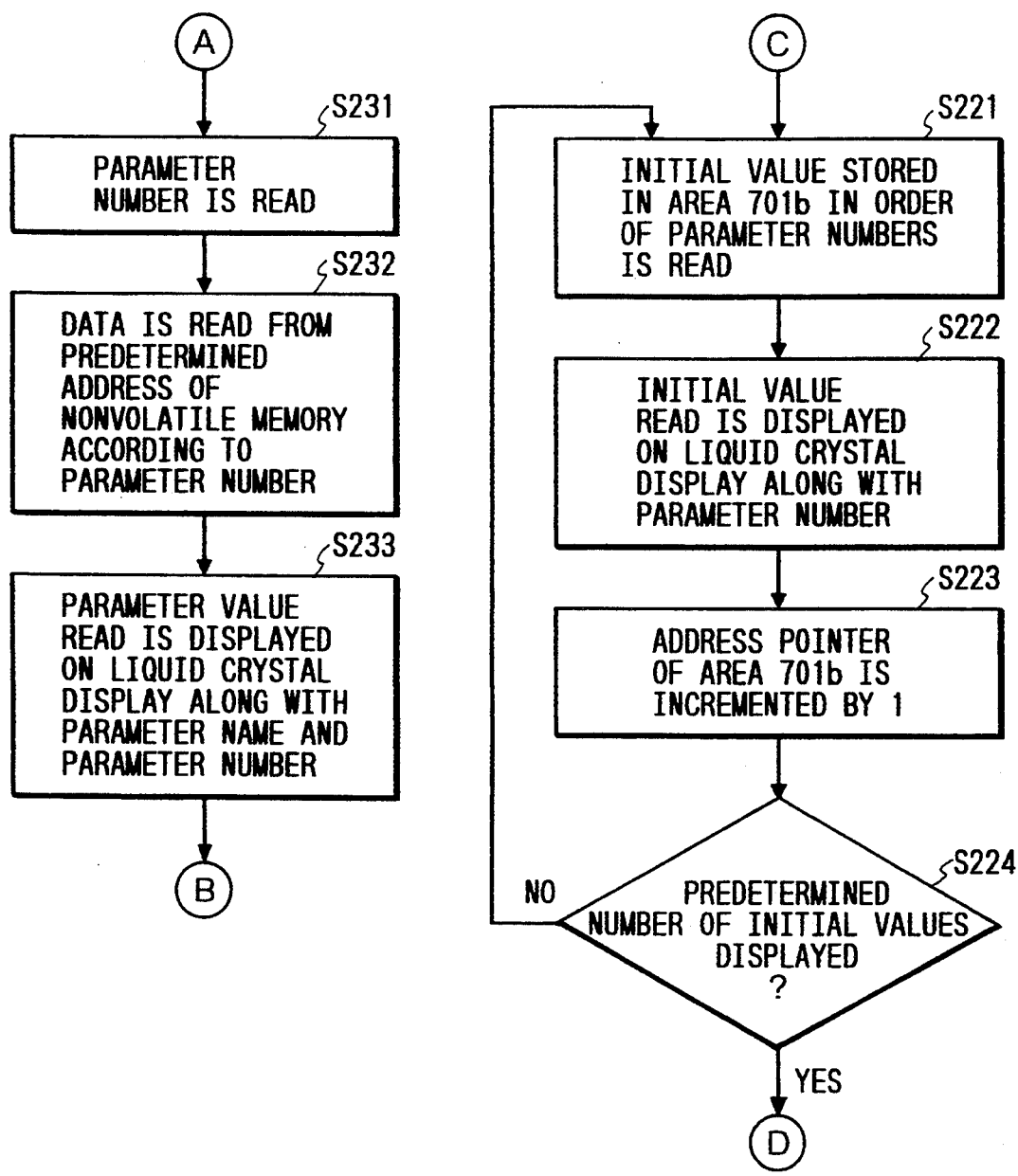
FIG. 3 is a flowchart illustrating a sequence of operations according to the preferred embodiment of the present invention shown in FIG. 1.

Operations at steps S808 to S811 and S840 will not be described here because they are identical to those at steps S208 to S211 and S240 given in FIG. 2, respectively. When the predetermined number of parameters have not yet been displayed at step S811, the processing returns to step S805. The display format on the liquid crystal display 1601 is identical to that shown in FIG. 4.

If a simple read request for a current parameter value is made, the processing progresses in sequence of steps S801, S831, S832 and S833 in FIGS. 8 and 9. Operations at steps S801, S831 and S832 are identical to those at steps S201, S231 and S232 in FIGS. 2 and 3 and therefore will not be described here.

At step S833, it is determined whether or not there is a parameter prewritten depending on whether or not the parameter value read at step S832 is insignificant, e.g., a blank. When it has been determined that the parameter was prewritten, the processing advances to step S835. When it has been determined that the parameter was not prewritten, the processing proceeds to step S834. At step S834, the initial value of the corresponding parameter number is read from the area 701b of the ROM 701 and the processing proceeds to step S835, Operation at step S835 is identical to that at step S233 in FIG. 3 and therefore will not described here. The display format on the liquid crystal display 1601 is identical to that in FIG. 5.

If a request for the initial value list of parameters is made, the processing advances in sequence of steps S801, S802, S803, S821, S822, S823 and S824 in FIGS. 8 and 9. These operations will not be described here because they are identical to those at steps S201, S202, S203, S221, S222, S223 and S224 in FIGS. 2 and 3. The display format on the liquid crystal display 1601 is identical Go that in o FIG. 6.

It will be appreciated that the three-phase inverter apparatus employed in the first and second embodiments of the present invention may also be a single-phase or another multi-phase inverter apparatus and the induction motor 4 may also be a synchronous motor. Also, the inverter may also be any motor drive control apparatus that drive-controls a motor according to parameters.

It will also be appreciated that new parameters, the factory set value list, etc., displayed using the parameter setting apparatus 1501 may also be displayed employing another display device such as a programmable controller or a personal computer.

It will also be appreciated that the areas 701a, 701b of the ROM 701 and the RAM 8 contained within the microprocessor 601 in the control section 5 may also be installed in the outside or connected by a bus.

Figure 10:
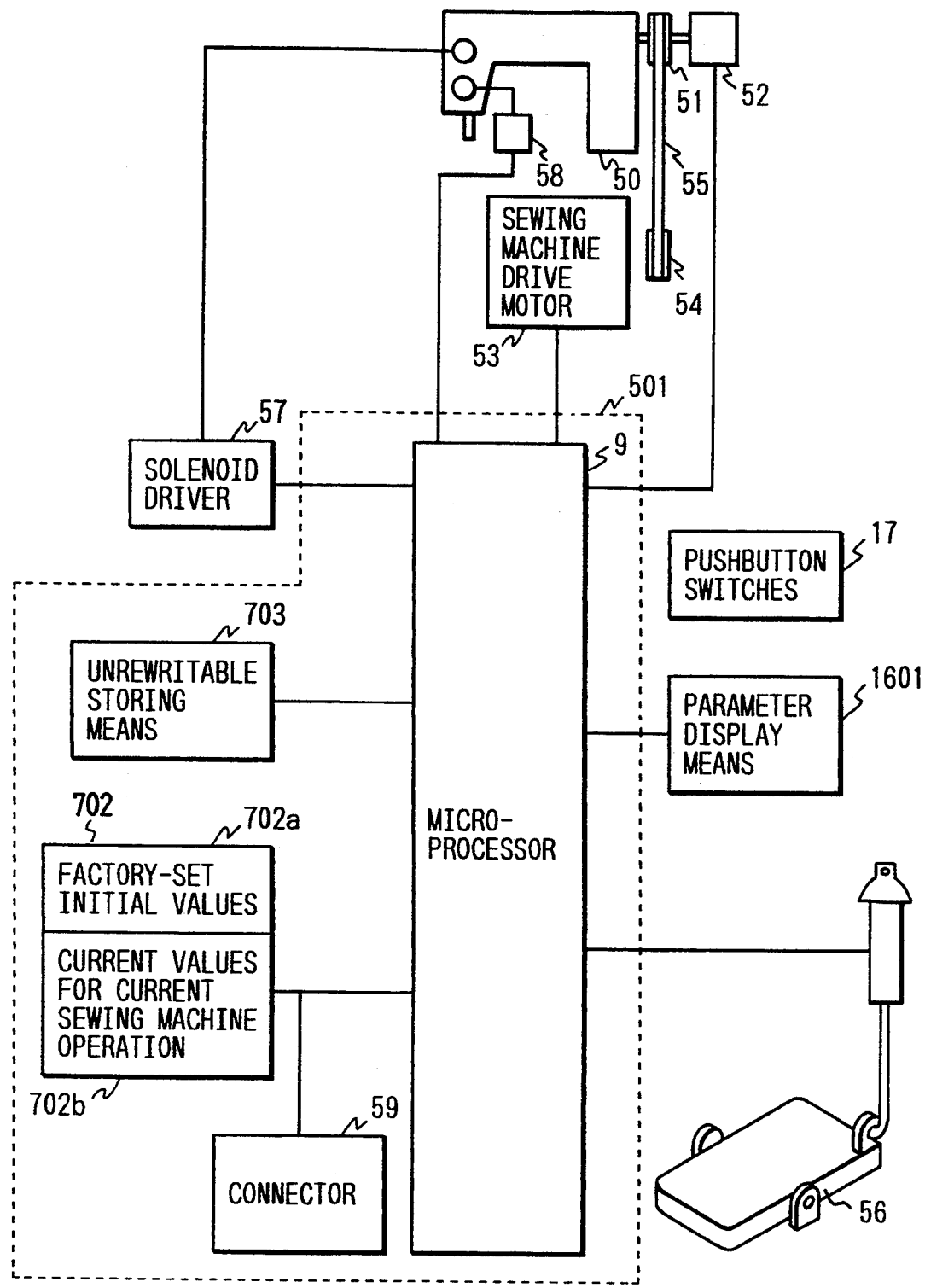
FIG. 10 is a block diagram illustrating the arrangement of an example wherein the present invention applies to a sewing machine control apparatus.

As another embodiment of the present invention, a case where the present invention applies to a sewing machine control apparatus will now be described. FIG. 10 is a block diagram showing the embodiment wherein the present invention applies to a sewing machine control apparatus. Referring to FIG. 10, 50 indicates a sewing machine, 51 denotes a sewing machine pulley, 52 indicates a needle position detector mounted on the shaft of the sewing machine pulley 51 for generating three different needle position signals of one pulse per revolution (needle UP position signal, needle DOWN position signal and thread trimmer position signal), 53 represents a sewing machine drive motor, 54 designates a motor pulley, and 55 indicates a belt. The rotational force of the sewing machine drive motor 53 is transmitted from the sewing machine pulley 51 to the sewing machine 50 via the motor pulley 54 and belt 55. 9 indicates a microprocessor which controls the sewing machine operation, and 56 designates a pedal used to perform variable-speed operation, i.e., toe down, light heeling and full heeling. 57 indicates a solenoid driver installed on .the sewing machine 50 for thread trimmer, thread tension release, wiper, reverse stitching and other operations, and 58 denotes a presser bar lifter which automatically lifts the presser foot of the sewing machine 50 using a solenoid, air, etc. 17 indicates parameter setting unit, e.g., pushbutton switches, for setting various parameters for sewing machine operation, 1601 represents a parameter display device for displaying parameter values set for sewing machine operation, 702 indicates a rewritable storing unit for storing the parameter values set by the pushbutton switches 17, 703 designates an unrewritable storing unit for storing the basic set values of the parameters, and 59 denotes a signal transfer apparatus, e.g., a connector, for transferring signals between the rewritable storing unit 702 and an external device. The microprocessor 9, the unrewritable storing unit 703, the connector 59 and the rewritable storing unit 702 constitute a control section 501.

In a sewing machine, there are "basic set values" of the parameters. These values are used to cause the sewing machine control apparatus concerned with the present embodiment to carry out general or standard operations. The basic set values normally are stored in ROM, i.e., unrewritable storing unit 703, and are not rewritable for protection of the standard operating parameters.

There also are other parameter values set for special operations. Specifically, these are factory-set initial values used by the sewing machine control apparatus concerned with the present embodiment to perform special operations desired by a specific user. The combination of basic values and initial values, as originally set or as changed, comprise the "current values" employed for current sewing machine operation.

The rewritable storing unit 702 includes an initial value storage 702a for storing the factory-set initial values of the parameters employed to drive the sewing machine 50 and a current value storage 702b for storing the current values of the parameters that have been set.

Figure 12:
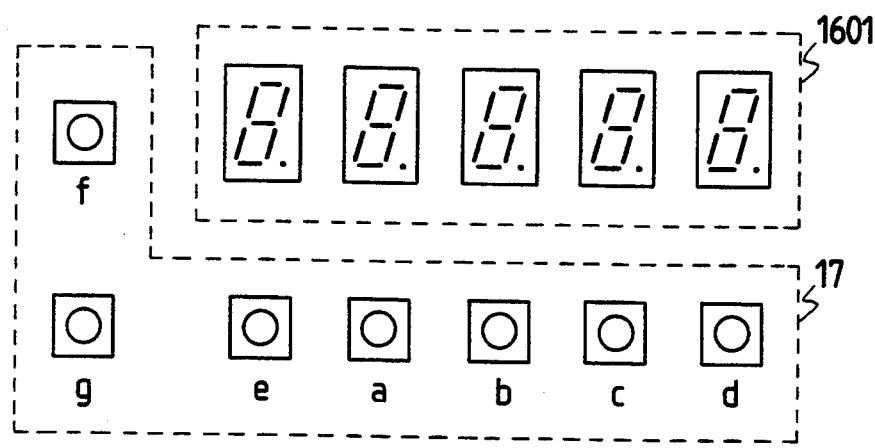
FIG. 12 illustrates the details of parameter setting means and display means in a case where the present invention applies to the sewing machine control apparatus.
Figure 15:
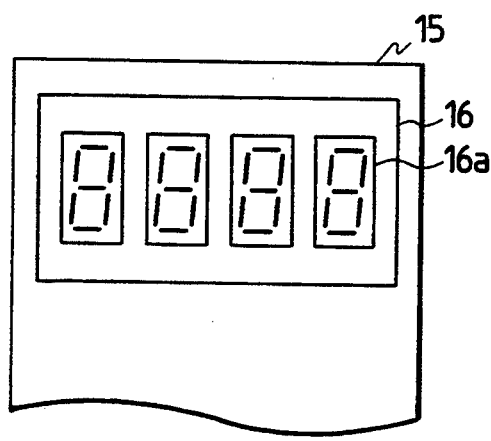
FIG. 15 is a flowchart illustrating a sequence of operations of the conventional drive control apparatus.

FIGS. 11(a)-11(d) show the items of data stored in the rewritable storing unit 702, and FIG. 12 illustrates the details of the pushbutton switches 17 used to set the parameters for sewing machine operation and the display unit 1601 which displays the parameter values for sewing machine operation.

The operation of the sewing machine control apparatus according to the present embodiment, which is arranged as described above, will now be described.

When, at the start of stitching, the pedal 56 is toed down to the maximum at a stitching start point, the microprocessor 9 causes the sewing machine drive motor 53 to rotate, and the sewing machine 50 is operated via the motor pulley 54, belt 55 and sewing machine pulley 51 at the maximum speed set by the pushbutton switches 17, thereby forming stitches. At a stitching end point, the pedal 56 is set to a neutral position to stop the sewing machine 50.

To change a stitching direction, the operator performs the light heeling operation of the pedal 56 to lift the presser foot of the sewing machine 50 and changes the direction of a fabric. After returning the pedal 56 to the neutral position to lower the presser foot, the operator performs the toe down operation of the pedal 56 to operate the sewing machine 50 again.

To trim a thread, the operator performs the full heeling operation of the pedal 56 so that the thread trimmer, thread tension release and wiper solenoids installed on the sewing machine 50 are driven by the solenoid driver 57, and also operates the sewing machine 50 at the thread trimmer speed set by the pushbutton switches 17, thereby trimming the thread. This sequence of operation control is carried out by the microprocessor 9 which controls the sewing machine drive motor 53, solenoid driver 57 and presser bar lifter 58 in response to input signals from the needle position detector 52 and pedal 56.

In the above operations, the operations of the sewing machine drive motor 53, solenoid driver 58, etc., at the time of thread trimmer operation will vary for different sewing machine types, and parameter setting changes are made frequently to perform these operations. The parameter setting changes will now be described.

FIG. 12 illustrates parameter settings made to specify the current sewing machine operation. The parameters are set by the pushbutton switches 17 and parameter display unit 1601. For example, when f and g of the pushbutton switches 17 are held down concurrently for five seconds, the microprocessor 9 judges it as a data setting mode. In this mode, the microprocessor 9 displays a set parameter value on the display means 1601 in accordance with the pushbutton switches 17 controlled by the operator. In this state, the operator looks at the display unit 1601 and selects an item to be set by controlling f and g of the pushbutton switches 17, and sets a desired numerical value by controlling a, b, c and d of the pushbutton switches 17. The microcomputer 9 causes the parameters thus set for sewing machine operation to be stored into the rewritable storing unit 702 for storing the parameters. If any wrong setting has been made for some reason in the course of these setting changes, it may be necessary to return the corresponding parameter value to the factory-set initial value, check the initial value, and perform a re-setting.

A procedure for checking the factory-set initial value will now be described. Hold down f and g of the pushbutton switches 17 at the same time and switch ON the power of the sewing machine control apparatus, and further hold down f and g of the pushbutton switches 17 for a certain period of time (e.g., five seconds). The microprocessor 9 then judges it as a data transfer mode. In this mode, the microprocessor 9 displays the item and data of the initial value on the display unit 1601. The operator views the display unit 1601 and controls f and g of the pushbutton switches 17 to display the item desired to be set.

A sequence of copying the factory-set initial values to the current value storage 702b which stores the set values used for a current sewing machine operation, i.e., current values, will now be described. Hold down f and g of the pushbutton switches 17 simultaneously and switch ON the power of the sewing machine control apparatus, and further hold down f and g of the pushbutton switches 17 for a given period of time (for example, five seconds). The microprocessor 9 then judges it as the data transfer mode. When a, b and c of the pushbutton switches 17 are held down concurrently and continuously for a predetermined period of time (e.g., ten seconds) in this mode, the microprocessor 9 copies the initial values in the initial value storage 702a of the rewritable storing unit 702 to the current value storage 702b which stores the current values used for current sewing machine operation, as shown in FIG. 11(a).

A sequence of copying the current values used for a current sewing machine operation to the initial value storage 702a which stores the initial values will now be described. Hold down f and g of the pushbutton switches 17 at the same time and power up the sewing machine control apparatus, and further hold down f and g of the pushbutton switches 17 for a given period of time (for example, five seconds). The microprocessor 9 then judges it as the data transfer mode. When a, b, c and g of the pushbutton switches 17 are held down concurrently and continuously for a predetermined period of time (e.g., ten seconds) in this mode, the microprocessor 9 copies the current values in the current value storage 702b used for current sewing machine operation to the initial value storage 702a storing the initial values, as shown in FIG. 11(b).

A procedure of copying the basic set values to the current value storage 702b which stores the current values used for current sewing machine operation will now be described. Hold down f and g of the pushbutton switches 17 simultaneously and switch ON the power of the sewing machine control apparatus, and further hold down f and g of the pushbutton switches 17 for a given period of time (e.g., five seconds). The microprocessor 9 then judges it as the data transfer mode. When a, b, c and d of the pushbutton switches 17 are held down concurrently and continuously for a certain period of time (for example, fifteen seconds) in this mode, the microprocessor 9 copies the basic set values to the current value storage 702b, which stores the current values used for current sewing machine operation, as shown in FIG. 11(c). At this time, the basic set values may be copied to the initial value storage 702a as shown in FIG. 11(d).

A sequence of providing the current values used to specify the current sewing machine operation from an external device and fetching the current values used to specify the current sewing machine operation to the external device will now be described. Give a signal equivalent to the toe down operation of the pedal 55, a signal equivalent to the full heeling operation of the pedal 55, a signal equivalent to the light heeling operation of the pedal 55, a needle UP position signal of the needle position detector 52 and a needle DOWN position signal of the needle position detector 52 simultaneously and switch ON the power of the sewing machine control apparatus, and further switch OFF all of these signals within a predetermined period of time (for example, five seconds). The microprocessor 9 then sets a microprocessor 9 port connected with the rewritable storing means 702 to high impedance, whereby the rewritable storing unit 702 is disconnected from the control of the microprocessor 9. In this status, the rewritable storing unit 702 can be accessed optionally via the connector 59. Data given by the external device via the connector 59 can be copied as the set values for specifying the current sewing machine operation. Similarly, the set values used to specify the sewing machine operation can be fetched to the external device via said connector 59. For example, to make the same setting to a plurality of sewing machine control apparatuses, it is only necessary to input the set values from a single sewing machine control apparatus, check operation, fetch the set values of said single control apparatus from the rewritable storing unit storing the set values, and input the fetched set values to the other sewing machine control apparatuses.

Figure 13:
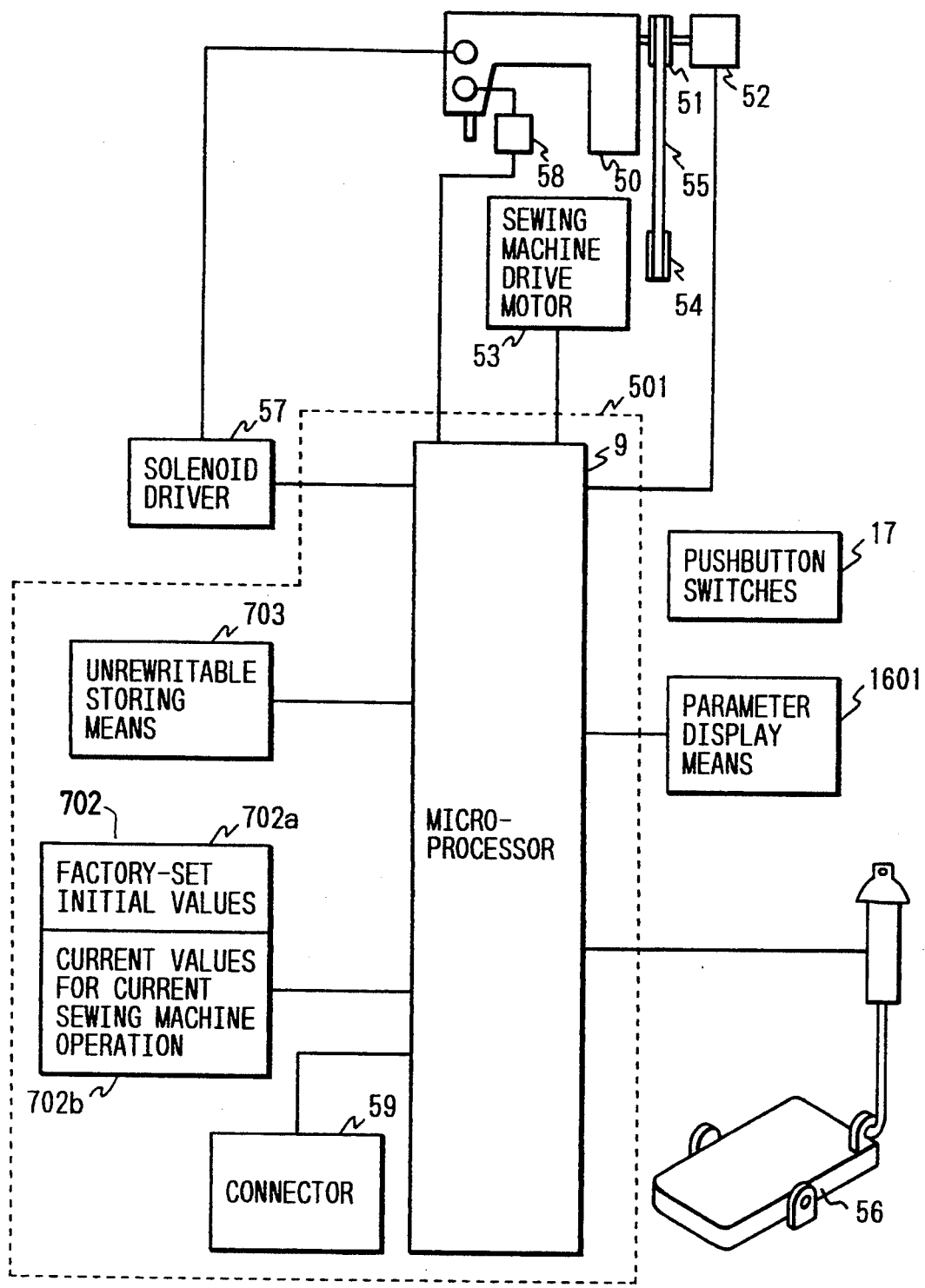
FIG. 13 is a block diagram illustrating the arrangement of another example wherein the present invention applies to the sewing machine control apparatus.

FIG. 13 shows a modification of the embodiment shown in FIG. 10, which has been modified in the connection relationships between the rewritable storing unit 702, the connector 59 and the microprocessor 9 and performs identical operations.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present to disclosure of the preferred embodiment has been made only by way of example and that numerous changes in the details and arrangement of components may be made without departing from the spirit and scope of the invention as hereinafter claimed.

What is claimed is:

1. A drive control apparatus for a driven sewing machine, comprising:
   parameter setting means for setting parameters used to operate the driven sewing machine;
   unrewritable storing means for storing a basic set of values of said parameters for standard sewing machine operations;
   rewritable storing means having an initial value storage for storing initial values of said parameters, and a current value storage for storing the current values of said parameters for current sewing machine operations; and
   wherein said parameter setting means is operative to (1) copy said basic set of values of said unrewritable storing means to said current value storage of said rewritable storing means, and (2) copy said basic set of values to said initial value Storage.

2. A drive control apparatus as set forth in claim 1, further comprising:
   comparing means for comparing said initial values with said current values to identify a mismatch between an initial value and a current value; and
   display means for displaying the identity of each stored parameter having a mismatch between its initial value and its current value.

3. A parameter displaying method in a drive control apparatus for a driven sewing machine for drive-controlling the sewing machine according to a plurality of parameters indicating control characteristics of the driven sewing machine, said method comprising:
   setting parameters used to operate the driven sewing machine;
   storing a basic set of values of said parameters in an unrewritable storing means;
   storing initial values of said parameters in an initial value storage of a rewritable storing means;
   storing current values of said parameters, for current sewing machine operations, in a current value storage of the rewritable storing means;

copying the basic set of values of said unrewritable storing means to said current value storage of said rewritable storing means; and copying said basic set of values to said initial value storage of said rewritable storing means.

4. A parameter display method as set forth in claim 3, further comprising:

comparing said initial values with said current values to identify a mismatch between an initial value and a current value; and displaying the identity of each stored parameter having a mismatch between its initial value and its current value.

* * * * *